No. 884,201. PATENTED APR. 7, 1908.
J. O'LEARY.
FENDER AND BRAKE ATTACHMENT FOR AUTOMOBILES.
APPLICATION FILED DEC. 24, 1907.
2 SHEETS—SHEET 2.
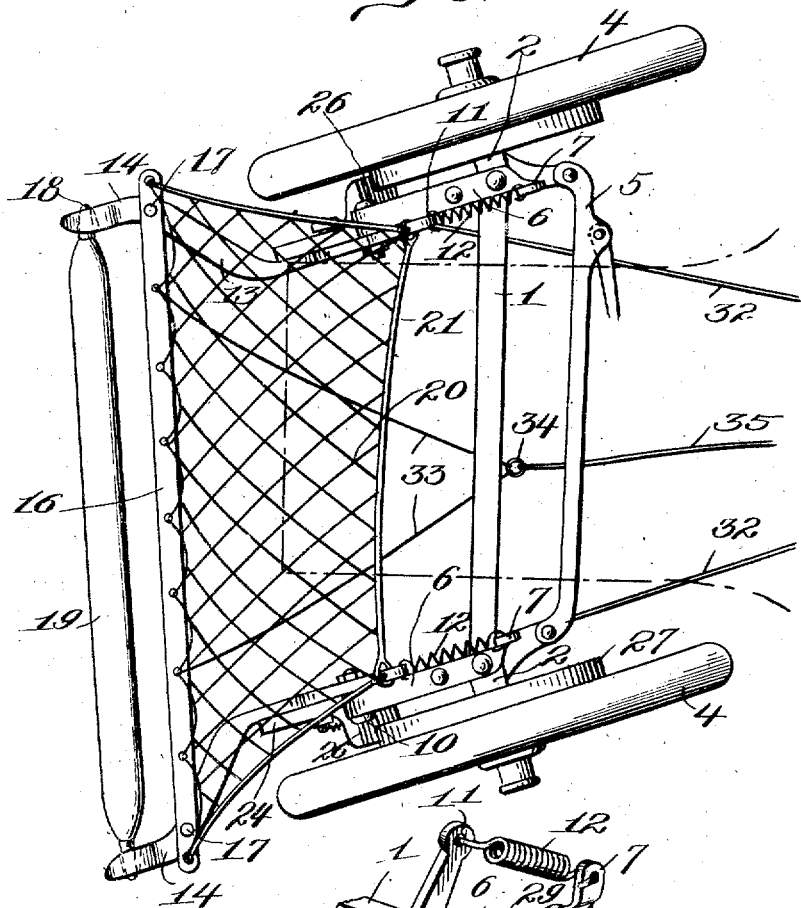
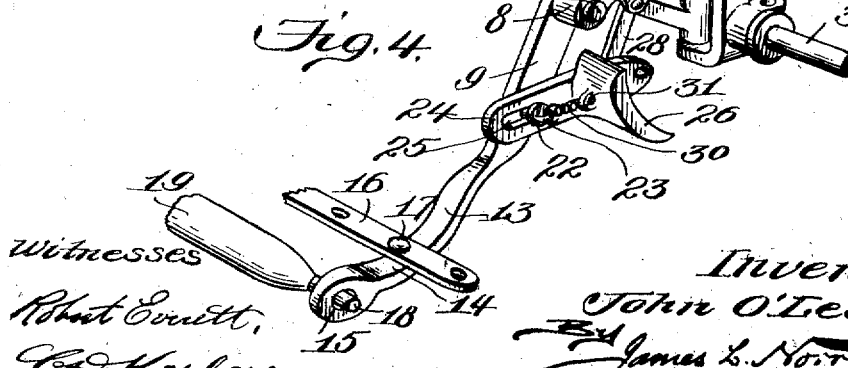
Witnesses
Robert Everitt,
C. D. Hesler
Inventor
John O'Leary
By James L. Norris
Atty.

UNITED STATES PATENT OFFICE.

JOHN O'LEARY, OF COHOES, NEW YORK, ASSIGNOR OF ONE-HALF TO EDWARD PENROSE, OF COHOES, NEW YORK.

FENDER AND BRAKE ATTACHMENT FOR AUTOMOBILES.

No. 884,201.　　　Specification of Letters Patent.　　　Patented April 7, 1908.

Application filed December 24, 1907. Serial No. 407,881.

*To all whom it may concern:*

Be it known that I, JOHN O'LEARY, a citizen of the United States, residing at Cohoes, in the county of Albany and State of New York, have invented new and useful Improvements in Fender and Brake Attachments for Automobiles, of which the following is a specification.

This invention relates to fender and brake attachments for automobiles or motor cars and other like vehicles, and the primary object of the same is to equip an automobile or motor car with a life guard means in the form of a fender so organized as to assume a position in consonance with the arcuate movement of the front wheels of the automobile or car and be thus rendered especially effective as a means to obstruct the passage of the car over human beings when turning corners, the fender attachment automatically assuming an operative position low enough to take in the person or object struck and also manually operative or controllable by a driver or chauffeur.

Combined with the fender embodying the features of this improvement are brake shoes which may be brought into play or effectively contact with the front wheels at a time subsequent to the engagement of the fender with a person or object in the road, but such brake shoes do not immediately engage the front wheels when the fender meets an obstruction to avoid throwing the obstruction that may fall into the fender outwardly from the latter by bringing the automobile or car to a too sudden stop. The brake shoes are therefore made operative by independent means or by devices under control of the driver and are so connected as to be operated independently of the fender and used at any time similarly to ordinary braking attachments.

The fender and brake shoes are applied to the inner portions of the front wheels so as to leave the outer portions of said wheels free of any confining devices. The fender is also automatically raised to normal position after it has been struck and liberated by removing therefrom the object that may be caught up thereby. The automatic elevation of the fender is accomplished through the medium of spring devices which are of such tension that when the fender is lowered or depressed by contact with an object the brake shoes will not be forced into contact with the portions of the wheels with which they coöperate, but are in such close proximity to the braking portions of the wheels that they may be quickly applied with advantage in stopping the machine after the fender has performed its function.

The invention also consists in the details of construction and arrangement of the several parts which will be more fully hereinafter specified.

In the drawings: Figure 1 is a longitudinal section of the front portion of the running gear of an automobile showing the improved attachment applied thereto and also in longitudinal section, and illustrated as elevated, a part of the body of the automobile being shown in dotted lines. Fig. 2 is a similar view showing the fender in lowered or depressed position. Fig. 3 is a top plan view of the front portion of the running gear of an automobile showing the attachments applied thereto. Fig. 4 is a detail perspective view of a portion of the attachments.

Similar characters of reference are employed to indicate corresponding parts in the several views.

The numeral 1 designates the front axle of an automobile or car, and 2 the knuckles pivoted at the opposite ends of said axle and having stub shafts 3 projecting laterally therefrom. On the stub shafts or axles 3 the front wheels 4 are mounted and to the knuckles 2 a shifting rod or bar 5 is connected as usual and may have any suitable form of shifting mechanism connected thereto and operative from the interior of the automobile or car to control the movement of the front wheels to direct the course of the automobile or other vehicle.

Brackets 6 are fixed on and move with the knuckles 2, the rear ends of the brackets having upwardly projecting lugs or ears 7 and the forward ends thereof being enlarged and bored transversely to provide suitable pivot bearings 8. Each knuckle carries a single bracket and pivotally held against the inner sides of the bearings 8 are fender arms 9, the latter being connected to the bearings 8 by pivot pins 10. The arms 9 are pivoted to the front extremities of the brackets 6 at points below the upper extremities of the said arms, the upper ends of the arms being formed or provided with apertures or eyes 11 to which are attached the front terminals of retractile springs 12, the rear ends of said springs being connected to the lugs or ears 7. The arms 9 have their lower extremities laterally and outwardly deflected as at 13, the lower ends of the arms extending forward in an approximately straight line as at 14 and also provided with eyes 15. The arms 9 are preferably formed from flat bars of metal and the lower extremities are given a twist at a suitable angle to throw them outwardly so that the lower extremity or forward engaging portion of the fender will have sufficient lateral extent to effectively serve as a guard in front of the wheels 4 and also permit the upper portions of the said arms to be spaced in such relation to each other as to operatively fit within or adjacent to the inner sides of the wheels 4, as clearly shown by Fig. 3. The lower extremities of the arms 9 have a coupling bar 16 pivotally connected thereto as at 17 to cause the said arms to move in unison in opposite lateral directions and also to strengthen the fender structure. In the eyes 15 the reduced extremities 18 of a roller 19 are loosely mounted, the object of this roller being to facilitate the movement of the person or body struck into the fender. A suitable net 20 is secured at its lower edge to the coupling bar 16 and at its upper edge is attached to a cable or analogous flexible device 21 terminally secured to the arms 9 above the brackets 6.

Projecting inwardly from the inner side of each arm 9 is a headed stud 22 having a loop or eye 23, the two studs 22 being in transverse alinement. On these studs 22 brake arms 24 are slidably mounted and have slots 25 therein through which the studs project, the slots 25 being long enough to permit sufficient play of the said arms 24. Formed with or secured to the intermediate portions of the said sides of the arms 24 are brake shoes 26 disposed at such an angle as to practically engage braking flanges 27 on the inner sides of the wheels 4. The brake arms 24 and their shoes 26 are held in horizontal position by suspending links 28 pivotally attached at their upper ends to lugs or ears 29 depending from the bracket arms 6 and movably secured at their lower ends against the outer sides of the brake arms 24. It is obvious that without some restraining means, the brake attachment, as just explained, would slide against the braking flanges 27 of the wheels 4 when the vehicle was ascending an incline, and to obviate this disadvantage a spring 30 is connected to each eye 23 of stud 22 and to an eye 31 on the outer side of the center of the brake shoe 26. The brake attachment specified has a free sliding movement in connection with each fender arm 9, and when the fender is in normal position or elevated as shown by Fig. 1, the inner terminals of the slots 25 in the brake arms of each brake attachment will be located at a distance from the adjacent portions of the studs 22, or, in other words, the studs will be out of contact with the rear terminals of the said slots. When the brake attachments are in this position the engaging faces of the braking shoes 26 will be held in advance of the braking flanges 27 owing to the fact that the said attachments will gravitate forwardly and downwardly on the said studs 22.

When the fender is depressed as shown by Fig. 2, the fender arms 9 will be thrown rearwardly at the extremities thereof below the pivot pins 10, and the upper extremities of the said arms will be thrown forwardly against the resistance of the springs 12. The rearward movement of the arms 9 below the pivotal points of the latter forces the brake arms 24 rearwardly by reason of the studs 22 engaging the rear extremities of the slots 25, and the braking surfaces of the shoes are brought into close proximity to the braking flanges 27 so that by a simple operation which will be presently explained, the said shoes may be brought into full engagement with the braking flanges.

To the rear ends of the brake arms 24 pull-wires, chains, cables, or analogous devices 32 are secured and extend upwardly into the body of the automobile or car where they may be attached to suitable brake applying means. The coupling bar 16 also has pull cords, cables, or analogous devices 33 secured thereto and rearwardly converged towards a ring 34 having a single pull cord or analogous device 35 attached thereto and running back into the automobile or car and may be coupled or secured to a suitable operating device. The object of the cords or analogous devices 32 is to bring the brake shoes 26 in contact with the braking flanges 27, and the operation of the cords or analogous devices 33 and 35 will cause the fender to be depressed prior to the time that it may be struck by an object in the road in order to clear the road in advance of the automobile or car and when the object may be so small as to have insufficient weight or resistance to operate the fender.

From the foregoing it will be understood that in operation the fender accurately assumes at all times a position in advance of the wheels 4, both in straight running and in curved movements of the automobile or car, and in addition brake attachments are always in convenient position for application to the front wheels and which may be actuated independently of the operation of the fender, but serving as valuable accessories to the fender to facilitate stopping the machine after the fender has caught up a person or object in its course of movement.

Furthermore, the fender and brake attachments heretofore described may be readily applied to automobiles or cars now in use as there is no modification in the construction of these machines necessary to adapt them to the fender. The wheels 4 of the machine are clear, or are not inclosed by any part of the fender and hence they may be conveniently reached for tire repairs or substitutions and for other purposes without detaching any part of the fender organization.

Having thus fully described the invention, what is claimed as new, is:

1. In an automobile, car or the like, the combination with the front axle, front wheels, and movable connections carried by the axle and to which the wheels are attached, of a fender secured to the said movable connections and having its rear portions located wholly within the sides of the wheels.

2. In an automobile, or like vehicle, the combination with the front axle, front wheels having braking means, and movable connections carried by the axle and to which the wheels are attached, of a fender connected to the movable connections, and brake attachments coöperating with portions of the fender.

3. In an automobile, or like vehicle, the combination with the front axle, front wheels, and movable connections carried by the axle and to which the wheels are attached, of a fender attached to said connections and positioned in advance of the front wheels to turn in unison with the said wheels and having its attached extremity wholly within the inner sides of the wheels.

4. In an automobile, or like vehicle, the combination with the front axle, of a fender carried by and movable with portions of the axle and positioned in advance of the front wheels, and means for automatically elevating the fender after the latter has been depressed.

5. In an automobile, or like vehicle, the combination with the front axle and wheels on the latter, of a fender in advance of the wheels and operative to turn in unison with said wheels, and means for automatically elevating the fender after the latter has been depressed.

6. In an automobile, or like vehicle, the combination with the front axle and wheels thereon, of a fender disposed in advance of and movable in opposite lateral directions in consonance with the arcuate movement of said wheels to always serve as a guard means in advance of the wheels irrespective of the direction of movement of the latter, and means for automatically elevating the fender after the latter has been depressed.

7. In an automobile, or like vehicle, the combination with the front axle and wheels thereon, of a fender disposed in advance of and movable in opposite lateral directions in consonance with the arcuate movement of said wheels to always serve as a guard means in advance of the wheels irrespective of the direction of movement of the latter, yielding means for holding the fender in normally elevated position, and manually operative means connected to the fender for depressing the latter.

8. The combination with an automobile or like vehicle, provided with front movable axle members having wheels thereon, of a fender arranged in advance of the front wheels and connected to the axle members and movable in unison with the latter to assume the same arc of movement as the said wheels, the fender being normally elevated, and manually operative means attached to the fender for depressing the same.

9. The combination with an automobile, or like vehicle, provided with front movable axle members having wheels thereon, of a fender arranged in advance of the front wheels and connected to the axle members and movable to assume the same arc of movement as the wheels, yielding means for maintaining the fender in its normally elevated position, and manually operative means for depressing the fender.

10. The combination with an automobile, or like vehicle, provided with front wheels movable at an angle with relation to the body of the automobile or vehicle, of a fender arranged in advance of the front wheels and movable in opposite lateral directions in consonance with the angular movement of the wheels, the rear attached extremity of the fender being disposed between the inner sides of the wheels to leave the latter clear and unconfined.

11. The combination with an automobile, or like vehicle, of a fender arranged in advance of the front wheels and movable in opposite lateral directions in consonance with the movement of the wheels, and brake attachments movably carried by portions of the fender to engage the front wheels and operative independently of the movement of the fender.

12. The combination with an automobile, or like vehicle, of a fender arranged in advance of the front wheels and movable in opposite lateral directions in consonance with the movement of the wheels, brake attachments carried by portions of the fender to engage the front wheels and movable independently of the fender, and means for normally holding the fender elevated and having sufficient resistance to prevent the application of the brake shoes when the fender is lowered or depressed.

13. The combination with an automobile, or like vehicle, of a fender arranged in advance of the front wheels and movable in opposite lateral directions in consonance with the movement of the wheels, brake attachments slidably carried by portions of the fender to engage the front wheels and operative independently of the movement of the fender, and manually controllable means connected to the brake attachments.

14. The combination with an automobile, or like vehicle, of a fender arranged in advance of the front wheels, and brake attachments carried by portions of the fender to engage the front wheels and operative independently of the movement of the fender, and manually controllable means connected to the brake attachments.

15. The combination with an automobile, or like vehicle, provided with wheels movable at an angle to the body of the automobile or vehicle, of a fender arranged in advance of the front wheels and movable in opposite lateral directions in consonance with the angular movement of the said wheels, the rear extremity of the fender being transversely reduced to fit inside of the front wheels and the front extremity laterally extended to always project outwardly beyond the said front wheels.

16. The combination with an automobile, or like vehicle, of a fender arranged in advance of the front wheels, braking attachments slidably mounted on portions of the fender and gravitatingly returning to normal position when the fender is elevated, and manually controllable means for operating the braking attachments to engage portions of the front wheels.

17. The combination with an automobile, or like vehicle, of a fender arranged in advance of the front wheels, braking attachments slidably mounted on portions of the fender and gravitatingly returning to normal position when the fender is elevated, and means coöperating with the braking attachments for holding the latter off the front wheels when ascending an incline.

In testimony whereof I have hereunto set my hand in presence of two subscribing witnesses.

JOHN O'LEARY.

Witnesses:
NATHAN C. HURST.
JOHN WATSON.